(12) United States Patent
Hintermaier

(10) Patent No.: US 11,358,495 B2
(45) Date of Patent: Jun. 14, 2022

(54) METHOD AND DEVICE FOR CONTROLLING A VEHICLE SEAT

(71) Applicant: Bayerische Motoren Werke Aktiengesellschaft, Munich (DE)

(72) Inventor: Wolfgang Hintermaier, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 112 days.

(21) Appl. No.: 16/378,719

(22) Filed: Apr. 9, 2019

(65) Prior Publication Data

US 2019/0232822 A1 Aug. 1, 2019

Related U.S. Application Data

(63) Continuation of application No. PCT/EP2017/072598, filed on Sep. 8, 2017.

(30) Foreign Application Priority Data

Oct. 25, 2016 (DE) ...................... 10 2016 220 997.3

(51) Int. Cl.
*B60N 2/02* (2006.01)
*B60N 2/22* (2006.01)
(Continued)

(52) U.S. Cl.
CPC ......... *B60N 2/0276* (2013.01); *B60N 2/0244* (2013.01); *B60N 2/14* (2013.01);
(Continued)

(58) Field of Classification Search
CPC ...... B60N 2/0276; B60N 2/0244; B60N 2/14; B60N 2/22; B60N 2/62; B60N 2002/0272
See application file for complete search history.

(56) References Cited

U.S. PATENT DOCUMENTS

| 7,159,683 B2 | 1/2007 | Reitter |
| 7,200,474 B2 | 4/2007 | Motozawa et al. |

(Continued)

FOREIGN PATENT DOCUMENTS

| CN | 102227333 A | 10/2011 |
| CN | 102264572 A | 11/2011 |

(Continued)

OTHER PUBLICATIONS

International Search Report (PCT/ISA/210) issued in PCT Application No. PCT/EP2017/072598 dated Nov. 27, 2017 with English translation (six (6) pages).

(Continued)

*Primary Examiner* — Tyler J Lee
*Assistant Examiner* — Yufeng Zhang
(74) *Attorney, Agent, or Firm* — Crowell & Moring LLP

(57) ABSTRACT

A method controls drive units for adjusting vehicle seat components. According to the method, a vehicle speed-dependent and crash-related nominal position or a vehicle speed-dependent and crash-related nominal position range are defined for at least one component. Starting from an actual position that is the same as the nominal position or from an actual position within the nominal position range, the actual position cannot be manually or automatically adjusted in the first instance or can only be adjusted in the nominal position range in the second instance, independently from the identification of a crash situation. Starting from an actual position that is different from the nominal position or outside the nominal position range, the actual position is automatically adjusted towards the nominal position or the nominal position range, preferably according to the identified defined situations, independently from the identification of a crash situation.

15 Claims, 2 Drawing Sheets

(51) Int. Cl.
*B60N 2/62* (2006.01)
*B60N 2/14* (2006.01)

(52) U.S. Cl.
CPC .............. *B60N 2/22* (2013.01); *B60N 2/62* (2013.01); *B60N 2002/0272* (2013.01)

(56) References Cited

U.S. PATENT DOCUMENTS

| | | | |
|---|---|---|---|
| 9,463,715 B1* | 10/2016 | Rawlinson | B60N 2/0742 |
| 2005/0232469 A1* | 10/2005 | Schofield | B60W 30/18 |
| | | | 382/104 |
| 2011/0218713 A1 | 9/2011 | Hashimoto et al. | |
| 2011/0291448 A1 | 12/2011 | Hashimoto | |
| 2012/0032482 A1 | 2/2012 | Hashimoto et al. | |
| 2014/0084656 A1 | 3/2014 | Hozumi et al. | |
| 2018/0072315 A1* | 3/2018 | Enthaler | B60W 30/10 |
| 2020/0062146 A1* | 2/2020 | Freienstein | B60N 2/0276 |

FOREIGN PATENT DOCUMENTS

| | | |
|---|---|---|
| CN | 102317109 A | 1/2012 |
| DE | 197 47 547 A1 | 5/1999 |
| DE | 10 2004 040 322 A1 | 2/2006 |
| DE | 10 2014 214 364 A1 | 2/2016 |
| DE | 10 2014 214 849 A1 | 2/2016 |
| FR | 2 736 879 A1 | 1/1997 |

OTHER PUBLICATIONS

Japanese-language Written Opinion (PCT/ISA/237) issued in PCT Application No. PCT/EP2017/072598 dated Nov. 27, 2017 (six (6) pages).

German-language Search Report issued in counterpart German Application No. 102016220997.3 dated Jul. 13, 2017 with partial English translation (11 pages).

Chinese-language Office Action issued in Chinese Application No. 201780061692.2 dated Nov. 4, 2020 with English translation (12 pages).

* cited by examiner

METHOD AND DEVICE FOR CONTROLLING A VEHICLE SEAT

CROSS REFERENCE TO RELATED APPLICATIONS

This application is a continuation of PCT International Application No. PCT/EP2017/072598, filed Sep. 8, 2017, which claims priority under 35 U.S.C. § 119 from German Patent Application No. 10 2016 220 997.3, filed Oct. 25, 2016, the entire disclosures of which are herein expressly incorporated by reference.

BACKGROUND AND SUMMARY OF THE INVENTION

The invention relates to a method and to a device for controlling a vehicle seat with regard to comfort criteria, on the one hand, and safety criteria, on the other hand.

A method of such a type and a device of such a type are already known, for instance from DE 10 2014 214 849 A1 or DE 197 47 547 A1. In these cases, the backrest and the seating surface of a vehicle seat are activated with the following steps: 1) initial setting of an angle of inclination of the backrest, and/or an angle of inclination of the seating surface as base position; and 2) in particular, time-dependent variation of the angle of inclination of the backrest, and/or the angle of inclination of the seating surface around the base position. The perception underlying these printed publications was that static sitting is unhealthy and is uncomfortable over a relatively long period. Therefore, a method for controlling a vehicle seat was to be created that, while retaining the safety demanded for a vehicle seat, enables comfortable sitting over a long period of time.

Furthermore, there are methods and devices for controlling restraint systems (DE 10 2004 040 322 A1), which in the case of detection of a crash also provide a seat adjustment as a matter of principle.

In the age of increasing automated driving, the extent of the adjustment options with respect to a vehicle seat is becoming greater, and the requirements in terms of safety are consequently becoming more stringent.

The object underlying the invention is therefore to enhance the safety of adjustable seats still further with greater variety in terms of adjustment options.

In the case of the method according to the invention for controlling drive units for adjusting vehicle-seat components, a vehicle-speed-dependent crash-related set position or a vehicle-speed-dependent crash-related set-position range is preset for at least one component.

Starting from an actual position equal to the set position (which may also be a minimum position) or from an actual position within the set-position range, in accordance with the invention—regardless of the detection of a crash situation—in the first case the actual position is not manually or automatically adjustable, or in the second case the actual position is adjustable only within the set-position range.

Starting from an actual position different from the set position or outside the set-position range, in accordance with the invention—regardless of the detection of a crash situation—the actual position is automatically adjusted in the direction of the set position or in the direction of the set-position range.

The method according to the invention is carried out, in particular, by way of an appropriately programmed electronic control unit via certain input signals and output signals, in a manner preferentially dependent on detected defined situations.

The invention is based on the following considerations.

Previous systems for protecting the occupants in the event of a crash activate the necessary actuators for adjusting the seat settings only when a crash situation is detected. In particular, drivers of vehicles that drive in a highly automated or fully automated manner, or persons in the front-passenger seat or on the rear-seat bench, can move the seats into a resting or sleeping position. From this resting or sleeping position, there is no possibility to move the occupants into an optimal seat position after the detection of a crash situation, because the adjustment distance is too great and the time needed for this is not sufficient. However, the optimal seat position is necessary in order to keep the loads on the occupants as slight as possible and either to prevent possible injury completely or to moderate it as far as possible.

As used herein, driving with automated longitudinal or transverse guidance, or at least partially autonomous driving with automated longitudinal and transverse guidance, may be understood by the term "automated driving". The term "automated driving" encompasses automated driving with an arbitrary degree of automation, in particular assisted, partly automated, highly automated, fully automated or driverless driving. In the case of assisted driving, the driver performs the longitudinal or transverse guidance permanently, whereas the system takes over the respective other functions. In the case of partly automated driving, the system takes over the longitudinal and transverse guidance, with the driver having to monitor the system permanently. In the case of highly automated driving, the system takes over the longitudinal and transverse guidance, without the driver having to monitor the system permanently, but the driver must be capable of taking over the guidance of the vehicle within a certain time. In the case of fully automated driving, the system can automatically manage the driving in all situations for a specific application; no driver is required any longer for this application. In the case of driverless autonomous driving, the system can manage all situations automatically during the entire journey; a driver is generally no longer required. With respect to these definitions, reference is made to the VDA [Verband der Automobilindustrie=German Automobile Industry Association] table relating to the degrees of automation of automated driving (see VDA Magazine—Automation: From Driver Assistance Systems to Automated Driving, September 2015).

In a general embodiment of the invention, the adjustment of the seats therefore not only occurs in the event of a crash but happens continuously or at intervals. In the event of a crash, an optimal occupant position is to be guaranteed. This can happen, for instance, by virtue of a maximal seat-back inclination dependent on the current speed. At low vehicle speeds, large seat-back inclinations are permitted, since the maximally expected deceleration in the event of a crash causes no injury to the occupants. With increasing speed, the maximally allowed seat-back inclination is reduced. If the current seat-back inclination exceeds the maximally allowed seat-back inclination, the seat-back inclination is set to the permissible maximum value by an actuator. If the vehicle returns to lower speed ranges, the occupant can incline the back again as far as the currently maximally allowed angle of the back. This can also happen in an automated manner.

The adaptation of the seat-back inclination can also happen by virtue of the establishment of an operating mode, or in situation-dependent manner. Accordingly, in parking situations or traffic-congestion situations the seat back can be inclined a long way back.

In addition to the backrest, it is also sensible to incorporate a possible leg-support and/or (if available) a rotation about the vertical axis and/or other adjustable components into the control.

Advantages of the invention:
Enhanced safety for occupants
Optimal seat position in the event of a crash
Consideration of different operating modes
More seat comfort for certain driving situations Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
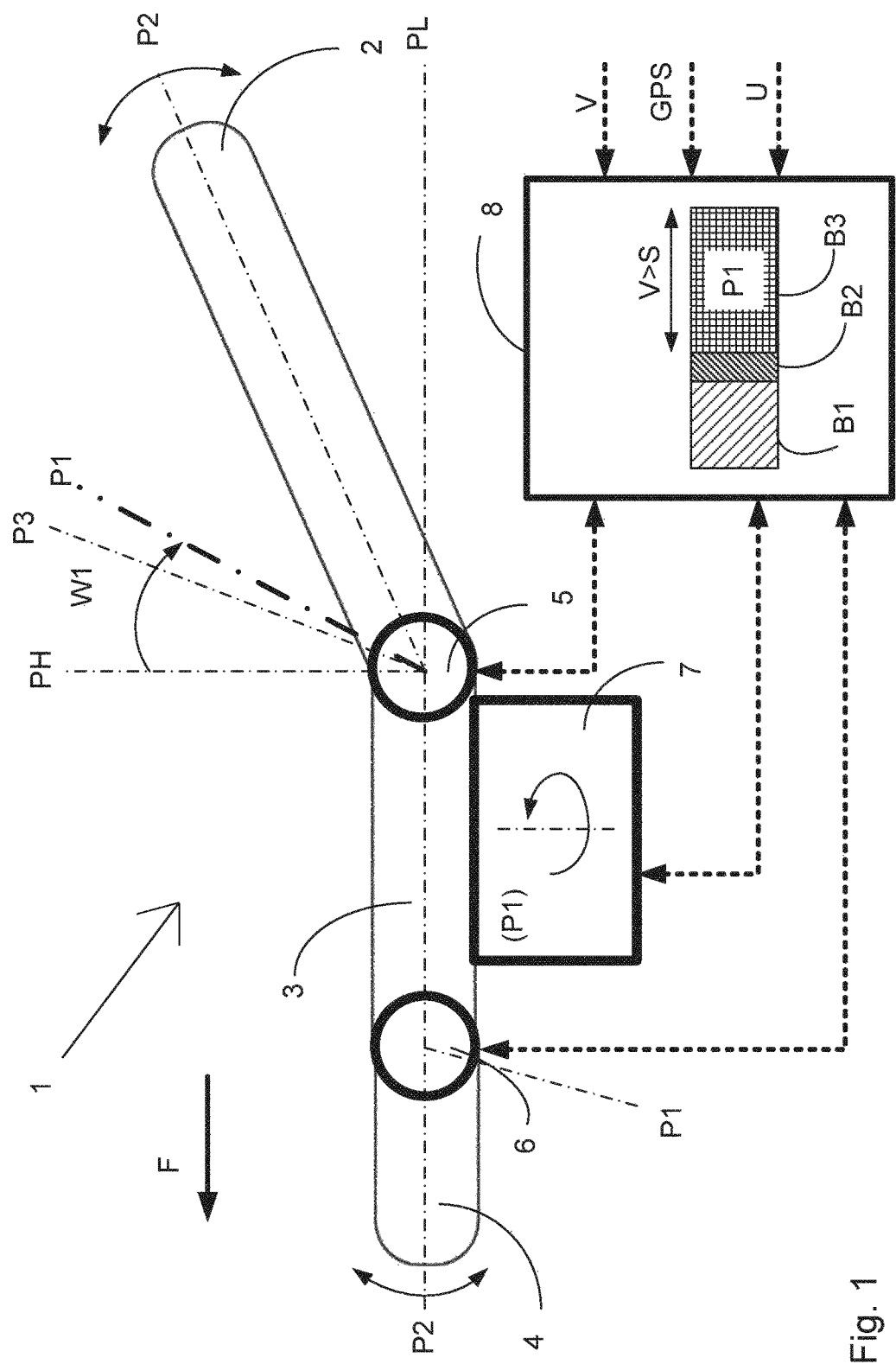
FIG. 1 is a schematic representation of an overview of the essential components of the invention with examples relating to adjustable seat components.

In FIG. 1, a vehicle-seat system 1 for a vehicle (which is not represented in any detail) is shown, which comprises an electronic control unit 8 and a vehicle seat with, for instance, the following three adjustable components: a back 2 which is adjustable in its angle of inclination, a leg-support 4 which is adjustable in its angle of inclination, and a seating surface 3 which is rotatable about the vertical axis of the vehicle. The invention could, in particular, also encompass a seating surface that is adjustable in its angle of inclination or in the longitudinal direction of the vehicle, and/or a height-adjustable headrest, etc., as adjustable vehicle-seat components, which however will not be dealt with in any detail in the following embodiment.

The back 2 is adjusted by a first drive unit 5, the leg-support 4 is adjusted by a second drive unit 6, and the seating surface 3 is adjusted by a third drive unit 7. The drive units 5, 6 and 7 are activated by the control unit 8 for the purpose of adjusting the components 2, 3 and 4.

The control unit 8 receives, for instance, the vehicle speed V, vehicle-position data GPS (or data pertaining to a navigation system, such as, for example, traffic-congestion information, road-type, etc.) and sensor data for a more detailed obstacle-related environment model U as input signals. The control unit 8 has been configured, in particular, by an appropriately programmed functional module in such a manner that the following method according to the invention can be carried out.

For the components 2, 3 and 4, in each case a set position P1 that is favorable for a possible crash, or a set-position range W1 that is favorable for a possible crash, is preset in a stepwise manner or continuously, depending on the current vehicle speed V and/or on a vehicle speed V predicted in the near future. In the present case, the set-position range W1 is the angle of inclination of the backrest 2 between the vertical axis PH of the vehicle and a set back position P1, which here is to be the respective vehicle-speed-dependent minimum angle of inclination in the event of a crash.

Alternatively or additionally, a further set position P1 in the form of a set angle of inclination of the leg-support 4 in relation to the longitudinal axis PL of the vehicle may have been preset.

Figure 2:
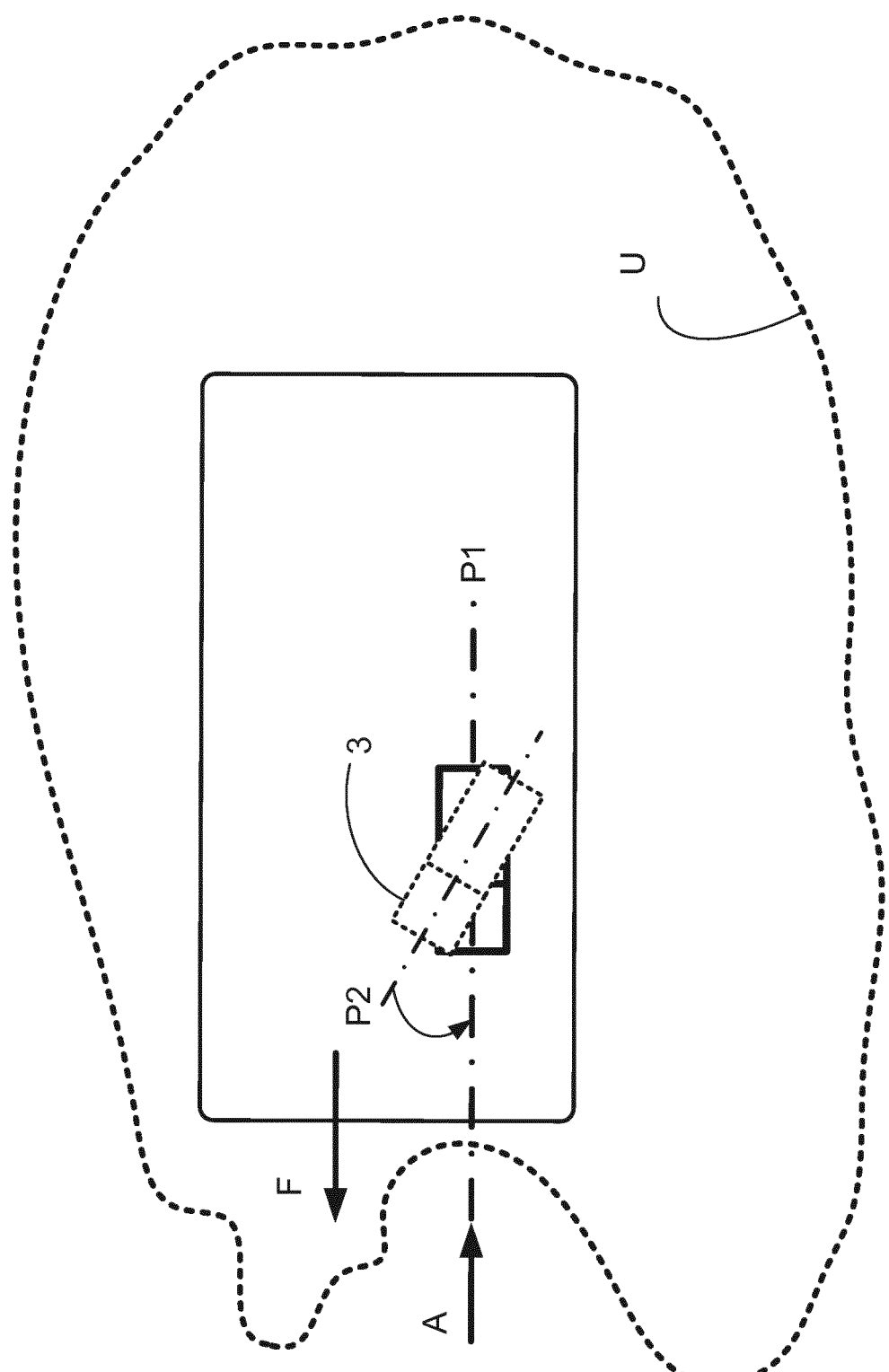
FIG. 2 is a further example relating to a rotatable seat component.

Again alternatively or additionally, a further set position P1 in the form of a set angle of rotation or in the form of a maximally permissible set angle of rotation of the seating surface 3 (or of the entire seat) in relation to the longitudinal axis PL of the vehicle, in relation to the direction of travel F, or in relation to the direction A of a possible collision foreseeable via the environment model U, may have been preset (see FIG. 2).

Starting from an actual position P2 of the back 2, of the leg-support 4 and/or of the seating surface 3 different from the set position(s) P1 or outside the set-position range W1, regardless of the detection of a crash situation, the actual position P2 is automatically adjusted in the direction of the set position P1 or in the direction of the set-position range W1.

Starting from an actual position P3 (here, only of the back 2) equal to the respective set position P1 or (as in FIG. 1) within the set-position range W1, in accordance with the invention—regardless of the detection of a crash situation—in the first case the actual position P2 is not manually or automatically adjustable, or in the second case (as represented in FIG. 1) the actual position P2 is adjustable only within the set-position range W1. Adjustment beyond the range W1 would be prevented.

The automatic adjustment of a component or the prevention of the adjustability of a component is preferentially undertaken in a manner depending on at least one defined situation.

In FIG. 1, as an example of a defined situation the presence of a certain comparatively high speed range B3 is represented, in which the vehicle speed V is greater than a certain threshold S that would result in an increased degree of risk. An automatic adjustment in the direction of P1 or W1 could already be begun in preparatory manner in a transition range B2 when approaching this speed range B3 from below. However, within a lower speed range B1—which, for instance, could point to a traffic-congestion situation (0<V<S)—the prevention of the manual adjustment or the automatic adjustment could be canceled, so that a vehicle occupant could set any comfortable possible position.

A further defined situation may also be the (impending) leaving of a parking situation or traffic-congestion situation and also the occurrence of a certain comparatively high traffic density—detected via the environment model U—or the (impending) leaving of a freeway—detected via the position data GPS of a navigation system with route entered.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of controlling drive units that adjust vehicle-seat components, the method comprising the steps of:
predefining, based on a speed of the vehicle, for at least one component, a set-position associated with a vehicle crash situation or a set position range associated with the vehicle crash situation;
when the vehicle reaches a given speed and either starting from an actual position equal to the set-position as a first case, or starting from an actual position within the set-position range as a second case, preventing the actual position from being manually or automatically adjustable regardless of a detection of a crash situation in the first case or allowing the actual position to be adjustable only within the set-position range regardless of the detection of a crash situation in the second case.

2. The method as claimed in claim 1, wherein automatic adjustment of a component or prevention of adjustability of a component is undertaken in a manner depending on at least one defined situation.

3. The method as claimed in claim 2, wherein the defined situation is a presence of a certain speed range.

4. The method as claimed in claim 2, wherein the defined situation is a leaving of a parking situation or a traffic-congestion situation.

5. The method as claimed in claim 2, wherein the defined situation is a leaving of a freeway.

6. The method as claimed in claim 2, wherein the defined situation is an occurrence of a certain comparatively high traffic density.

7. A method of controlling drive units that adjust vehicle-seat components, the method comprising the steps of:
predefining, based on a speed of the vehicle, for at least one component a set position that is associated with a vehicle crash situation or set-position range that is associated with the vehicle crash situation; and
when the vehicle reaches a given speed and starting from an actual position different from the set position or outside of the set-position range, automatically adjusting the actual position in a direction of the set position or in a direction of the set-position range regardless of a detection of a crash situation.

8. The method as claimed in claim 7, wherein automatic adjustment of a component or prevention of adjustability of a component is undertaken in a manner depending on at least one defined situation.

9. The method as claimed in claim 8, wherein the defined situation is a presence of a certain speed range.

10. The method as claimed in claim 8, wherein the defined situation is a leaving of a parking situation or a traffic-congestion situation.

11. The method as claimed in claim 8, wherein the defined situation is a leaving of a freeway.

12. The method as claimed in claim 8, wherein the defined situation is an occurrence of a certain comparatively high traffic density.

13. An electronic control unit comprising a processor that executes a software functional module in order to carry out a process of:
predefining, for at least one component, based on a speed of the vehicle, a set-position that is associated with a vehicle crash situation, or set position range that is associated with the vehicle crash situation;
when the vehicle reaches a given speed and either starting from an actual position equal to the set-position as a first case, or starting from an actual position within the set-position range as a second case, preventing the actual position from being manually or automatically adjustable regardless of a detection of a crash situation in the first case or allowing the actual position to be adjustable only within the set-position range regardless of the detection of a crash situation in the second case.

14. An electronic control unit comprising a processor that executes a software functional module in order to carry out a process of:
predefining, based on a vehicle speed, for at least one component a set position that is associated with a vehicle crash situation, or a set-position range that is associated with the vehicle crash situation; and
when the vehicle reaches a given speed and starting from an actual position different from the set position or outside of the set-position range, automatically adjusting the actual position in a direction of the set position or in a direction of the set-position range regardless of a detection of a crash situation.

15. A vehicle comprising a vehicle-seat system as claimed in claim 14.

* * * * *